United States Patent [19]

Lissant

[11] 3,983,213

[45] Sept. 28, 1976

[54] USE OF EMULSIONS IN CROWD CONTROL

[75] Inventor: Kenneth J. Lissant, St. Louis, Mo.

[73] Assignee: Petrolite Corporation, St. Louis, Mo.

[22] Filed: Feb. 26, 1973

[21] Appl. No.: 335,517

[52] U.S. Cl. .............................. 424/170; 424/168
[51] Int. Cl.² ................... A01N 9/04; A01N 17/10
[58] Field of Search ..................... 424/170, 77, 168

[56] References Cited
UNITED STATES PATENTS

| | | |
|---|---|---|
| 3,352,109 | 11/1967 | Lissant .................................. 60/217 |
| 3,490,237 | 1/1970 | Lissant .................................. 60/217 |
| 3,565,817 | 2/1971 | Lissant .............................. 252/312 |

*Primary Examiner*—Frederick E. Waddell
*Attorney, Agent, or Firm*—Sidney B. Ring; Hyman F. Glass

[57] ABSTRACT

This invention relates to the use of high internal phase ratio emulsions in restricting the access of persons and animals to an area; for example in crowd control, etc.

12 Claims, No Drawings

USE OF EMULSIONS IN CROWD CONTROL

This invention relates to the use of high internal phase ratio emulsions in denying and/or retarding the access of persons, animals, etc., to specific areas, such as in controlling and/or confining and/or dispersing unruly groups of persons such as crowds, mobs, etc., animals such as cattle, etc. It also relates to the use of such emulsions as or with incapacitating agents.

For as long as anyone has kept records, there have been situations where it was necessary or desirable to physically restrict human or animal access to particular areas, or render humans or animals incapable of aggressive action, and many techniques have been used to achieve this goal. In the case where certain restricted areas needed to be isolated or to be subjected to access control for extended periods of time, devices such as walls, moats, revetments, fences and other permanent installations were developed and employed. In situations where the necessity for denial of access was short lived or temporary or where the denial of access was to an object or vehicle whose geographic location was continually changing, various portable means of denying access were developed. These include such things as barbed wire, electrified barriers, bonfires, etc.

Until fairly recently, little or no concern was expressed for any injury which might accrue to someone attempting to gain access to a protected area. Recently, however, situations have arisen where it would be highly desirable to be able to restrict access to buildings, portions of towns, or other geographic locations in such a way that the access denying mechanism did not seriously damage or disrupt the environment nor did it inflict permanent physical damage, injury or death upon persons or animals attempting to breach the barrier. In an attempt to achieve such an objective, virtually solid walls of soldiers, policemen or national guard have been employed. It is becoming obvious that such a human barrier is itself subject to intolerable damage or injury and inclined to retaliate in ways that are not always deemed desirable. Thus, there is often a need for a passive, yet effective barrier which can be rapidly erected, readily removed and easily deployed. There is also a need for a means of incapacitating the invaders without doing them physical harm.

One method currently employed of denying and/or retarding the access of persons or animals to specific areas and/or to disperse unruly groups of individuals such as crowds, mobs, attackers, etc., comprises the use of high pressure water hoses whereby water under high pressure is turned upon unruly groups of persons, etc.

I have now discovered that the effect of water from high pressure hoses can be enhanced by a process which comprises the use of high internal phase ratio emulsions in place of high pressure water by turning upon a crowd a continuous or intermittent stream of high internal phase ratio emulsion instead of a stream of high pressure water.

I have now discovered that thixotropic high internal phase ratio emulsions can be employed as a crowd controller. In the preferred embodiment the emulsion contains an aqueous internal phase which makes up the major part of the emulsion, generally in excess of 80% and usually in excess of 90%, but preferably in excess of 95%, and a minor amount of an external phase such as a heavy oil and an emulsifying material. Because it is thixotropic and cohesive, it is easily pumped and very effective on contact.

The practice of turning a fire hose on an unruly mob is well known. In fact, fire hoses are quite effective in repelling a mob. They do, however, suffer from a number of drawbacks, for example:
1. The effective use of fire hoses to repel a mob requires the use of large amounts of water.
2. Large amounts of water may do an appreciable amount of damage to property.
3. A high pressure fire hose is a lethal weapon.

My system requires the use of substantially less water at lower velocities and still can be effective as an incapacitating agent without being lethal.

My emulsions, although they are primarily water, possess rather unique properties. In appearance they look like gells or thick solids. They can, however, be pumped and sprayed with conventional equipment. The emulsions can be rapidly produced on a continuous basis.

The applications of this invention to riot control are illustrated as follows: The emulsion would be drawn from a reservoir and fired from a hose or "gun" in an intermittent stream of 1 to 1 gallon "gobs." These would be projected at sufficient velocity to travel 100 to 200 feet, but not at the high lineal velocities encountered in a fire hose nozzle. Each of the semi-solid projectiles would weigh from 1 to 10 lbs. and would, therefore, impact with the same approximate force as a water filled bag or balloon. Upon impact, they would stick to and envelop the target. Thus a person attempting to advance under such a barrage would be repeatedly hit with sticky 1 to 10 lb. missiles. These would stick to his hair, face, and clothing and besides the physical effect of the impacts, would obstruct his vision and interfere with his breathing temporarily. Dyes or irritating or odorous agents could be incorporated into the formulation without difficulty. More drastic formulations could include lacrimators, sternutators, emetics and other toxicants.

Thus, the process of the present invention of retarding the advance of hostile persons or groups comprises turning on or propelling at, in, or against such persons or animals a continuous, or intermittent stream of high internal phase ratio emulsion with, or without, toxic or repellant materials.

Because of the inherent high viscosity of the high internal phase ratio emulsion, formulations may be produced which possess the desired viscosity properties without the incorporation of film-forming thickeners, or gelling agents.

Being hybrid solid-liquids, i.e. behaving as solids when at rest and as liquids when pumped, they possess the best properties of each. For example, it is possible to produce non-Newtonian emulsions which can be readily pumped by conventional equipment but which regain their high viscosity almost instantly and therefore not only allow greater control of the dispersion pattern but also adhere to the individuals and the area sprayed thus maintaining their effectiveness for a longer period of time.

These non-Newtonian preparations are best exemplified by stable high internal phase ratio emulsions. High internal phase ratio emulsions possess radically different properties from those of the low or medium internal phase ratio types. Specifically, they are non-Newtonian in nature exhibiting a yield value phenomenon and a decrease in the effective viscosity with shear rate. In contrast to gels which require significant time periods to recover their body when subject to shear, high internal phase ratio emulsions recover to high viscosities almost instantaneously.

By "non-Newtonian" I mean a fluid of thixotropic, rheopectic, or pseudo-plastic character. By definition, these fluids possess the property of exhibiting variable apparent viscosity when the shear rate is varied. Stated another way, when these fluids are pumped at low shear rates, they behave as though they are extremely viscous fluids; but as the pumping rate is increased and concomitantly the shear rate increases, the fluids appear to "shear thin" and then behave as though they have low viscosities.

I have particularly found, however, that the use of emulsions, and specifically high-internal-phase-ratio emulsions, i.e., where the internal phase is a major part of the emulsion, are particularly well suited for this purpose, since from an economic standpoint, large volumes of emulsion may be formulated with inexpensive major constituents thereby providing inexpensive fluids.

The non-Newtonian fluids employed in the practice of this invention, however, are characterized by the fact that when at rest or under low shear conditions they behave like elastic solids or extremely viscous liquids; but when subjected to moderate shear rates, such as are encountered in pumping through hoses at practical, but not extremely rapid rates, the fluids behave as though they were low viscosity media. These emulsions contain an internal phase which is the major part of the emulsions; for example, at least about 60%, such as at least about 80%, but preferably in excess of about 90%, by volume, and often 95% or higher.

High internal phase emulsions of the type which can be employed in this invention are of the type disclosed in the following patents: U.S. Pat. Nos. 3,352,109, 3,490,237, etc., provided the emulsions are essentially non-toxic.

The thixotropic emulsions of this invention, which have the characteristics of solids at rest and liquids when force is exerted on them, have the following advantages:

1. Yield Value — Yield values of 100 dy/cm$^2$ to more than 5,000 dy/cm$^2$ can be obtained. However, under low shear, they will flow with a viscosity approaching that of the liquid phases. On removal of shear, the recovery to original elastic solid film is nearly instantaneous. The hysteresis loop is very small.
2. Temperature Stability — Increased temperature has little effect on viscosity until the critical stability temperature is reached at which point the emulsion breaks into its liquid components. This permits a wide temperature range of use.
3. Shear Stability — Emulsions may be subjected repeatedly to shear without degradation so long as the critical shear point is not reached. At this point the emulsion breaks. However, the critical shear point is sufficiently high to permit normal pumping.
4. Quality Control — With these emulsions it is easy to reproduce batches with identical properties due to the absence of any "gel" structure.

Emulsions can be prepared by a continuous method, as described in U.S. Pat. No. 3,565,817. Thus, any of the essentially non-toxic oily and non-oily materials, emulsifiers and techniques, etc., described in the above applications can be employed in preparing the emulsions of this invention.

Since these emulsions have been described in such great detail in the above specifications, repetition herein is unnecessary.

The following examples are presented for purposes of illustration and not of limitation.

EMULSIFIER A

An emulsifier was prepared by oxyalkylating 1,3-butanediol with 3.0 parts by weight of butylene oxide, 32.2 parts of propylene oxide and 16.6 parts of ethylene oxide in the order given.

EMULSIFIER B

An emulsifier was prepared by oxyalkylating triethyleneglycol with 5.1 parts by weight of butylene oxide, 30.0 parts of propylene oxide and 22 parts of ethylene oxide in the order given.

EMULSIFIER C

An emulsifier was prepared by oxyalkylating octyl phenol with 0.80 parts by weight of ethylene oxide.

In addition non-oxyalkylated emulsifiers can also be employed.

The following examples illustrate the preparation and use of crowd controlling emulsions.

EXAMPLE I

A ¾ inch Jabsco, positive displacement pump, driven by a ¾ horsepower electric motor, was equipped with a 5 ft. plastic hose on the discharge side and the same type of hose connected to a "Tee" on the suction side. Another length of hose was attached to the Tee perpendicular to the direction of flow through the pump, and placed in a 55 gallon drum containing 47.5 gallons of water. The ends of the other two hoses were placed in a 55 gallon open-head, steel drum containing 2.5 gallons of a solution of 20% by volume emulsifier C and 80% kerosine colored with a minute quantity of an oil-soluble red dye. With this arrangement, the dyed solution of kerosine and emulsifier C could be pumped out of the drum, through the pump, and back into the drum while slowly mixing in the water. After approximately 20 minutes of mixing all of the water was added resulting in a thick, stable, light red emulsion with an oily external film. One hundred and fifty gallons of emulsion were made by this method.

EXAMPLE II

In order to study the relative effectiveness of various formulations, a "single shot" emulsion propelling device was constructed as follows:

A piece of aluminum tubing, 5.5 feet long and 2 inches in diameter, was threaded on one end with conventional pipe thread and a 2 inch standard cast iron tee was attached with the cross arm of the tee oriented along the long axis of the pipe. In the axial aperture, a conventional reducer from 2 to ¾ inch pipe was installed and into the reducer a quick opening ¾ valve was inserted. This valve was connected to an, 100 pounds per square inch, air line by the appropriate adapting connections. The side aperture of the tee was provided with a 2 inch solid plug which could be removed.

In operation, this device was clamped in a stand so that the long axis of the pipe was inclined at approximately 40° from the horizontal and the side opening of the tee was accessible from above. A small amount of water was used to wet the inside of the gun and approximately 1 pint of the emulsion produced in Example No. I was introduced through the side opening of the tee. The opening was then closed with the 2 inch plug and the charge of emulsion was ejected from the device by activating the quick opening valve connected to the air line.

EXAMPLE III

Using an apparatus similar to that described in Example No. 1 of U.S. Pat. No. 3,565,817 issued Feb. 23, 1971, except that the glass pipe was 2 inches in diameter, an emulsion essentially identical in composition to that described in Example No. 3 of the above patent was produced with an internal phase ratio of 95%; i.e. 95% volumes of water were emulsified in 5 volumes of the external phase.

EXAMPLE IV

Thirty gallons of an emulsion of the type described in Example III were placed in a metal cylinder to the bottom of which was connected a ⅝ inch hose terminating in a spray nozzle. The free space above the emulsion was pressured to 100 pounds per square inch with compressed air. Upon opening the valve at the bottom of the tank, the emulsion was expelled through the hose and nozzle producing a spray which could be directed at objects or surfaces and which coated them with a ¼ to 1 inch layer of emulsion.

EXAMPLE V

A fuel pump such as that used in a conventional diesel engine was connected so as to accept emulsion, as that prepared in Example III, from a reservoir and deliver it to a ½ inch pressure hose terminated by a restricting nozzle. The pump was coupled to a conventional ¼ H.P. electric motor. Using this apparatus, it was possible to direct a stream of emulsion for distances of up to 50 feet and to coat objects or surfaces with a layer of emulsion.

Besides being propelled at persons or animals, the emulsion can be used to cover an area, where its volume supplies a bulky physical barrier, which when an attempt is made to breach the barrier, adheres to the invader and impedes his progress and tends to incapacitate him. Odorants, irritants, lacrimators, sternutators, emetics, etc. can be incorporated into the internal aqueous phase. Similarly, separately or simultaneously, oil soluble repelling agents can be incorporated into the external phase of such emulsions. In appropriate situations, portable units for the production of the emulsions can be brought to the site connected to any source of water and barriers of emulsion of required width and height laid down in suitable positions to restrict access to the area. The nature of these emulsions is such that the repungant anti-personnel agents incorporated in the emulsion are not dispersed in the air or borne by the wind in excess amounts and as long as either the defenders or the crowd remain a small distance away from the barrier, no discomfort need be experienced. However, anyone attempting to physically breach the barrier is immediately subjected to the action of the repellent agent. This method of controlling access has the advantages of being completely passive, readily controlled and simply removed when the need for it has passed. The amount of repellent agent required is much less than is required in the use of devices such as smoke screens or tear gas bombs or grenades.

As is quite evident, a wide variety of thixotropic emulsions are useful in this invention. It is, therefore, not only impossible to attempt a comprehensive catalogue of such compositions, but to attempt to describe the invention in its broadest aspects in terms of specific chemical names for the components of such emulsions would be too voluminous and unnecessary since one skilled in the art could by following the description of the invention herein prepare an appropriate emulsion. This invention encompasses the use of thixotropic and other pseudo plastic fluids in access limiting formulations and the individual components of such fluids are important only in the sense that they affect this function. To precisely define each specific useful phase of the emulsion and emulsifier in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of specific phases of the emulsions and emulsifiers suitable for this invention by applying them in the process set forth herein. In analogy to the case of a machine, wherein the use of certain materials of construction or dimensions of parts would lead to no practical useful result, various materials will be rejected as inapplicable where others would be operative. I can obviously assume that no one will wish to use a useless emulsion nor will be misled because it is possible to misapply the teachings of the present disclosure to do so. Thus, any thixotropic emulsion that can perform the function stated herein can be employed.

I claim:

1. A process of restricting access of persons or animals to an area which is characterized by exerting a force on a thixotropic high internal phase ratio non-oil-in-oil emulsion comprising (1) non-oil, (2) an emulsifiable oil and (3) an emulsifying agent, said non-oil being present in said emulsion in an amount of at least 60% by volume of said emulsion, said emulsion having the characteristics of a solid when at rest and the characteristics of a liquid when a force is exerted on it, and propelling said emulsion at said area to which access is to be restricted.

2. The process of claim 1 which comprises imposing a barrier of said emulsion at the area to which access is to be restricted.

3. The process of claim 1 which comprises propelling at persons or animals seeking access to said area a continuous or intermittent stream of said emulsion.

4. The process of claim 1 where said emulsion also contains an incapacitating agent.

5. The process of claim 2 where said emulsion also contains an incapacitating agent.

6. The process of claim 3 where said emulsion also contains an incapacitating agent.

7. The process of claim 1 where said non-oil is water and said oil is kerosine and said water is present in said emulsion in an amount of at least 80% by volume of said emulsion.

8. The process of claim 2 where said non-oil is water and said oil is kerosine and said water is present in said emulsion in an amount of at least 80% by volume of said emulsion.

9. The process of claim 3 where said non-oil is water and said oil is kerosine and said water is present in said emulsion in an amount of at least 80% by volume of said emulsion.

10. The process of claim 4 where said non-oil is water and said oil is kerosine and said water is present in said emulsion in an amount of at least 80% by volume of said emulsion.

11. The process of claim 5 where said non-oil is water and said oil is kerosine and said water is present in said emulsion in an amount of at least 80% by volume of said emulsion.

12. The process of claim 6 where said non-oil is water and said oil is kerosine and said water is present in said emulsion in an amount of at least 80% by volume of said emulsion.

* * * * *